United States Patent [19]

Hashimoto et al.

[11] 4,435,153

[45] Mar. 6, 1984

[54] LOW BTU GAS BURNER

[75] Inventors: Takashi Hashimoto, Ibaraki; Shigeyuki Yamazaki, Abiko, both of Japan

[73] Assignee: Hitachi, Ltd., Tokyo, Japan

[21] Appl. No.: 284,792

[22] Filed: Jul. 20, 1981

[30] Foreign Application Priority Data

Jul. 21, 1980 [JP] Japan .................................. 55-98752
Jul. 21, 1980 [JP] Japan .................................. 55-98753

[51] Int. Cl.³ ............................................ F23D 11/44
[52] U.S. Cl. ................................... 431/208; 431/215; 431/240; 431/243
[58] Field of Search ............... 431/208, 215, 240, 242, 431/243

[56] References Cited

U.S. PATENT DOCUMENTS

| | | | |
|---|---|---|---|
| 3,457,121 | 7/1969 | Tomlinson | 431/215 |
| 4,052,143 | 10/1977 | Sandviknes | 431/215 |
| 4,104,018 | 8/1978 | McKay | 431/208 X |
| 4,318,689 | 3/1982 | Förster et al. | 431/208 |

*Primary Examiner*—Samuel Scott
*Assistant Examiner*—Margaret A. Focarino
*Attorney, Agent, or Firm*—Antonelli, Terry & Wands

[57] ABSTRACT

A burner for burning a low Btu gas including at least one set of fine ducts and at least one combustion chamber disposed on the downstream side of the set of fine ducts for obtaining combustion of the low Btu gas. Combustion gas produced in the combustion chamber heats the combustion chamber and the set of fine ducts through a wall of a combustor.

10 Claims, 7 Drawing Figures

LOW BTU GAS BURNER

BACKGROUND OF THE INVENTION

1. Field of the Invention

This invention relates to a low Btu gas burner suitable for burning low Btu gases in stable combustion.

2. Description of the Prior Art

Generally, gaseous fuels each have a lean limit of flammability. More specifically, when the ratio of a gaseous fuel to air or oxygen drops below a naturally determined value (lean limit of flammability), it becomes impossible to obtain combustion of the gaseous fuel or to cause the combustion thereof to be sustained in a stable state. A premixture below the lean limit of flammability (a mixture of the gaseous fuel with air or oxygen formed beforehand prior to combustion) is referred to as a low Btu gas. Difficulties as described hereinabove have been experienced in burning low Btu gases. It has recently been found that no lean limit of flammability practically exists for any low Btu gas when it is preheated to a temperature above a certain level. For example, in the case of a methane-air combustible mixture, it is possible to obtain complete combustion by preheating same to a temperature near 1400° K.

If it is possible to obtain burners for practical use for burning low Btu gases based on the above finding, energy that has hitherto been wasted in the atmosphere could be recovered from thin fuel gases below their lean limits of flammability, thereby greatly contributing to conservation of energy. Additionally it would be possible to avoid air pollution by the low Btu gases released to the atmosphere in large amounts.

Development of the art for obtaining stable combustion of low Btu gases is earnestly desired not only from the standpoint of achieving technical innovation but also from the standpoint of conserving energy and avoiding environmental disruption. Various proposals have been made to provide an apparatus for burning low Btu gases. Some disadvantages are associated with apparatus of the prior art for burning low Btu gases and none of previous apparatus have ever succeeded in their production on a commercial basis. Some of the proposed apparatus are complex in construction and high in cost and some need a different form of energy to be supplied from outside for preheating the low Btu gases to an elevated temperature and, consequently, are uneconomical.

SUMMARY OF THE INVENTION

An object of the invention is to provide a low Btu gas burner capable of obtaining stable combustion of a low Btu gas with a relatively simple construction and preheating the low Btu gas to an elevated temperature without requiring a different form of energy to be supplied from outside to sustain steady-state combustion.

Another object is to provide a low Btu gas burner capable of obtaining stable combustion of a low Btu gas in a wide range of mixtures from rich to lean.

A still another object is to provide a low Btu gas burner which has particular utility for handling low Btu gases of different concentrations (equivalence ratios).

According to the invention, there is provided a low Btu gas burner comprising a primary passage, a secondary passage separated from the primary passage by a wall of a combustor, a set of fine ducts located in at least the primary passage, a combustion chamber located on a downstream side of the set of fine ducts, and a heater located in the wall of the combustor. The primary and secondary passages are in communication with each other at one end thereof, with the other end of the primary passage being connected an inlet port for a low Btu gas and with the other end of the secondary passage being connected at the to an exhaust port for combustion gas, whereby the combustion gas can heat the set of fine ducts and the combustion chamber through the wall of the combustor.

Other and additional objects, features and advantages of the invention will become apparent from the description set forth hereinafter when considered in conjunction with the accompanying drawings.

DESCRIPTION OF THE PREFERRED EMBODIMENTS

Figure 1:
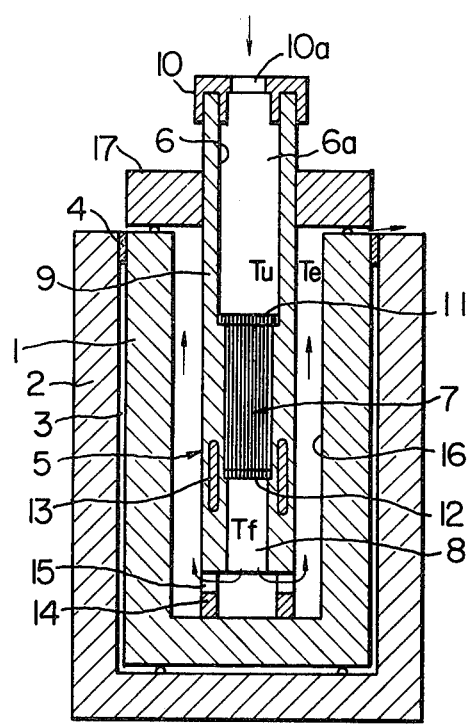
FIG. 1 is a vertical cross-sectional view of the low Btu gas burner comprising one embodiment of the invention.

Referring now to the drawings wherein like reference numerals are used throughout the various views to designate like parts and, more particularly, to FIG. 1, according to this figure, a low Btu burner includes an inner casing 1 is inserted in an outer casing 2 with a clearance 3 therebetween, and a heat insulating member 4 fitted in an upper portion of the clearance 3 to secure the inner casing 1 to the outer casing 2 and to avoid a leaking of heat from the inner casing 1 to outside through the outer casing 2. A combustor generally designated by the reference numeral 5, inserted in the inner casing 1 is formed with a primary passage 6 for introducing a low Btu gas therethrough, a duct means generally designated by the reference numeral 7 located on a downstream side of an inlet 6a of the primary passage 6, and a combustion chamber 8 located downstream of the set of fine ducts 7.

Figure 2:
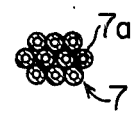
FIG. 2 is a transverse cross-sectional view, on an enlarged scale, of a part of the set of fine ducts of the burner shown in FIG. 1.

The combustor 5 includes a combustor wall 9 having a flange 10 at an upper portion thereof formed with an inlet port 10a for a premixture (low Btu gas) below its lean limit of flammability, so that the premixture supplied through the inlet port 10a is led to the inlet 6a of the primary passage 6 formed in the burner. As shown in FIG. 2, the duct means 7 located on the downstream side of the primary passage 6 include a plurality of fine tubes 7a and secured to the combustor wall 9 by flow regulating plates 11 and 12 respectively attached to the fine tubes 7a at the upper and lower ends thereof. The flow regulating plates 11 and 12 are formed with a plurality of apertures to perform the function of regulating the stream of premixture introduced from the primary passage 6 into the fine tubes 7a and leading the premixture from the fine tubes 7a to the combustion chamber 8 after regulating its flow. A heater 13 is embedded in a portion of the combustor wall 9 near the duct means 7 and combustion chamber 8 for heating the fine tubes 7a and combustion chamber 8 when the burner is started to effect preheating and ignition of the premixture. The combustor 5 is supported at its lower end by a support plate 14 having a communicating opening 15 formed therein to maintain the interior of the combustor 5 in communication with outside thereby facilitating a release of the combustion gas from the combustion chamber 8 to outside the combustor 5. A secondary passage 16 is defined between the inner casing 1 and the combustor wall 9 through which the combustion gas flows from the communicating opening 15. The combustion gas flowing through the secondary passage 16 heats the combustion chamber 8 and the fine tubes 7a through the combustor wall 9, before being drawn off from the burner through a combustion gas exhaust port, not shown, in the upper portion of the burner to be used for various purposes. Arrows indicate the direction in which the premixture and combustion gas flows. The inner casing 1 has a cover 17 attached to a top thereof for supporting the combustor 5 at its upper portion.

Operation of the embodiment shown in FIG. 1 will now be described, by referring to the combustion of a low Btu gas consisting of methane and air. At startup, a current is passed to the heater 13 to heat the set of fine ducts 7 and the combustion chamber 8 to a temperature in the vicinity of 1400° K. or over at least a temperature 900° K. which is the reaction initiating temperature. Then a premixture (low Btu gas) of methane and air, below its lean limit of flammability is supplied to the primary passage 6 in the combustor 5 via the inlet port 10a of the burner of the normal type. After having its flow regulated by the flow regulating plate 11 located downstream of the inlet port 10a, the premixture is introduced into the duct means 7 which is thoroughly heated. Moreover, the set of fine tubes 7a has a very large heat transfer area as compared with its passage area, so that the premixture introduced into the set of fine tubes 7a is efficiently preheated. When preheated to about 900° K., it gradually shows a combustion reaction, so that the premixture released from the set of fine tubes 7a through the flow regulating plate 12 undergoes complete combustion in the combustion chamber 8 and the temperature of combustion rises to about 1300°-1500° K. The stream of combustion gas makes a U-turn after passing through the communicating opening 15 and flows through the secondary passage 16 before being drawn off the combustion gas exhaust port, not shown, in the direction of an arrow. The combustor wall 9 is heated on both sides by the combustion gas in the combustion chamber 8 and the combustion gas flowing through the secondary passage 16, so that the combustion chamber 8 and the set of fine tubes 7a are heated to about 1400° K. following initiation of combustion. Thus, even if the supply of the current to the heater 13 is interrupted, it is possible to sustain combustion in a stable fashion. The burner according to the invention enables a low Btu gas to be preheated to a high temperature and combusted without receiving supply of a different form of energy from outside, in a steady-state combustion of the burner.

Figure 3:
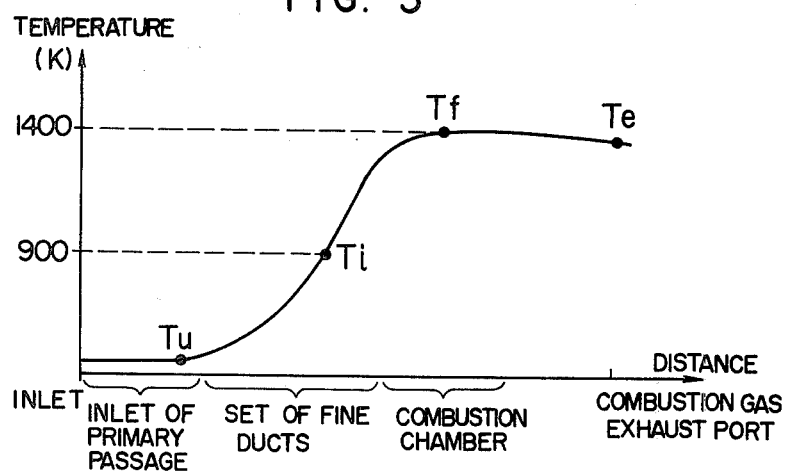
FIG. 3 is a graph showing the temperatures of the premixture or the combustion gas in various sections of the burner shown in FIG. 1.

In FIG. 3, the abscissa represents the distance from the inlet port 10a to the section through which the premixture or combustion gas flows, and the ordinate indicates the temperature of the premixture or combustion gas. The temperature Tu of the premixture in an arbitrarily selected position of the inlet 6a of the primary passage 6 is room temperature or slightly higher. However, it is rapidly heated upon entering the set of fine tubes 7a and preheated to the reaction initiating temperature Ti=900° K. while flowing therethrough to initiate combustion reaction. At the same time, the premixture is further preheated in the set of fine tubes 7a and undergoes complete combustion upon entering the combustion chamber 8 where the combustion gas reaches a combustion gas temperature Ti of about 1400° K. Thereafter, the combustion gas flows through the communicating passage 15 into the secondary passage 16 where the combustion gas has its temperature Te on the downstream side of the secondary passage 16 only slightly reduced to a lower level than the combustion gas temperature Tf in the combustion chamber 8. This is because the heat of the combustion gas leaks from the case of the burner due to the presence of the clearance 3 between the inner and outer casings 1 and 2, to provide a heat insulating dual structure in this embodiment. The combustion gas drawn off the combustion gas exhaust port has a temperature of 1300°-1400° K. which makes the combustion gas suitable for use for driving a gas turbine. When ordinary gaseous fuels are burned for producing combustion gas, the combustion gas has a high temperature of about 2500° K., so that it should be mixed with air to reduce the temperature to about 1400° K. when used for driving a gas turbine; however, the necessary reduction in temperature is inconvenient. On the other hand, the combustion gas obtained by burning a low Btu gas by the burner according to the invention is low in temperature and can be conveniently used for driving a gas turbine without any further treatment. It goes without saying that the combustion gas obtained by using the burner according to the invention can be used for many other purposes than driving a gas turbine.

Figure 4:
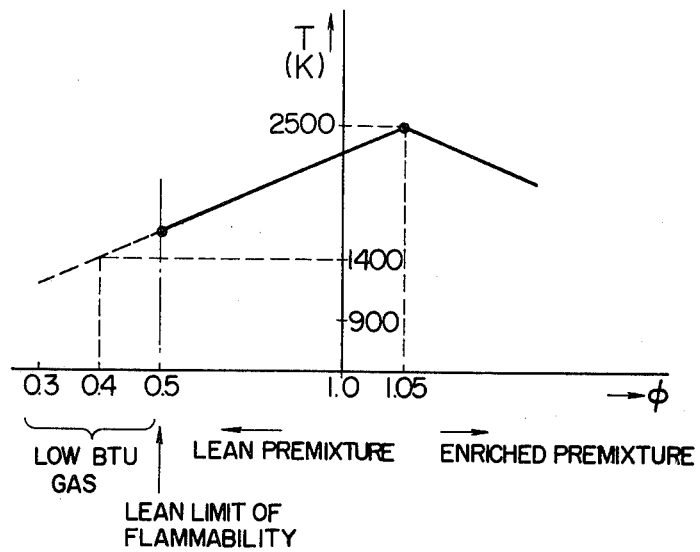
FIG. 4 is a graph showing the equivalence ratio $\phi$ of methane and the combustion temperature (adiabatic flame temperature) in the premixture of the methane with air.

An equivalence ratio $\phi$ is determined by the formula $\phi = 1/\lambda$ where $\lambda$ is the excess air ratio. Thus, when $\phi = 1.0$, the premixture contains air in a volume equal to the air volume theoretically necessary for burning the fuel contained therein. A premixture is rich (less air) when $\phi > 1.0$ and is lean (more air) when $\phi < 1.0$. As shown in FIG. 4, the combustion temperature (theoretical combustion temperature) is maximized and reaches about 2500° K. when the equivalence ratio $\phi$ is about 1.05, and drops when the equivalence ratio $\phi$ rises or falls from 1.05. When the equivalence ratio $\phi$ falls to about 0.5, the premixture has a lean limit of flammability and cannot be burned by an ordinary burner. A premixture having an equivalence ratio $\phi$ below the lean limit of flammability is referred to as a low Btu gas that can be burned by the burner according to the invention. In the burner according to the invention, the combustion temperature of a low Btu gas is about 1400° K. as shown in FIG. 4 and the combustion gas obtained is low in temperature. The lower the combustion temperature, the better results can be obtained in reducing NOx. It will be apparent from FIG. 4 that by selecting a suitable value for the equivalence ratio $\phi$ of the low Btu gas, it is possible to obtain combustion gas of any temperature as desired by using the burner according to the invention, so that the temperature of the combustion gas can be optimized for the use to which it is put.

Figure 5:
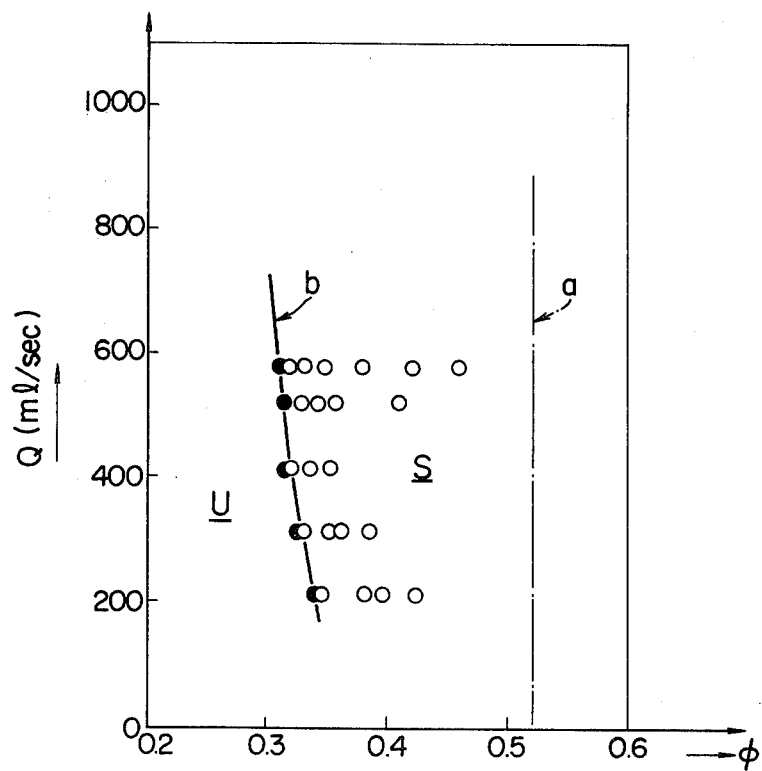
FIG. 5 is a diagrammatic representation of the results of experiments conducted on the range of equivalence ratios of the low Btu gas for obtaining stable combustion in the burner shown in FIG. 1.

In FIG. 5, the abscissa represents the equivalence ratio $\phi$ and the ordinate indicates the flow-rate Q per unit hour of the premixture supplied to the burner. The low Btu gas used in the experiments was the premixture of methane with gas. In the graph, a dash-and-dot line a represents the lean limit of flammability of the gas in an ordinary burner, and a curve b represents the stable combustion limits in one embodiment of the invention. The zone on the right side of the curve b representing the stable combustion limits is a stable combustion zone S and the zone on the left side thereof is an unstable combustion zone U. It will be seen from FIG. 5 that the burner according to the invention is capable of obtaining stable combustion of a low Btu gas of an equivalence ratio $\phi$ of 0.5–0.3 which is beyond the power of ordinary burners to burn.

The combustor wall 9 defining the combustion chamber 8 and the fine tubes 7a constituting the duct means 7 of the embodiment of FIG. 1 should be formed of a material such as, for example, heat resisting steel or ceramics, so as to be able to withstand elevated temperature and corrosive influences. In the embodiment of FIG. 1, the duct means 7 is composed of a plurality of fine tubes 7a. However, the invention is not limited to this specific form of the fine tubes 7a, and the tubes 7a may be of any known form so long as they are formed of heat resisting material and air permeable and have a large heat transfer area as compared with the passage area. In the embodiment of FIG. 1, the secondary passage 16 is defined between the inner casing 1 and the combustor wall 9 by inserting the combustor 5 in the inner casing 1; however, the same results as those achieved can be achieved by providing a cylindrical combustor wall in the interior of the combustion chamber 8 and the set of fine tubes 7a in the combustor 5 to let the combustion gas flow through a secondary passage formed in the combustor wall, to thereby heat the combustion chamber 8 and the duct means 7.

As noted above, the embodiment of FIG. 1 includes a plurality of fine tubes 7a and a combustion chamber 8 located downstream of the plurality of fine tube 7a, and the combustion gas of high temperature obtained by combustion of a low Btu gas in the combustion chamber 8 is used for heating the combustor wall 9 from opposite sides thereof, to thereby heat the combustion chamber 8 and the fine set of tubes 7a through the combustor wall 9. Thus, the low Btu gas can be preheated to a high temperature without supplying a different form of energy from outside and burned in steady-state combustion, to obtain stable combustion thereof. The embodiment is simple in construction and has a high practical value. The invention can achieve the additional effects of conserving energy by effecting energy recovery from low Btu gases and contributing to avoiding environmental disruption by preventing air pollution. Since combustion of a low Btu gas takes place at low temperature, it is possible to greatly reduce NOx which is responsible for air pollution.

Figure 6:
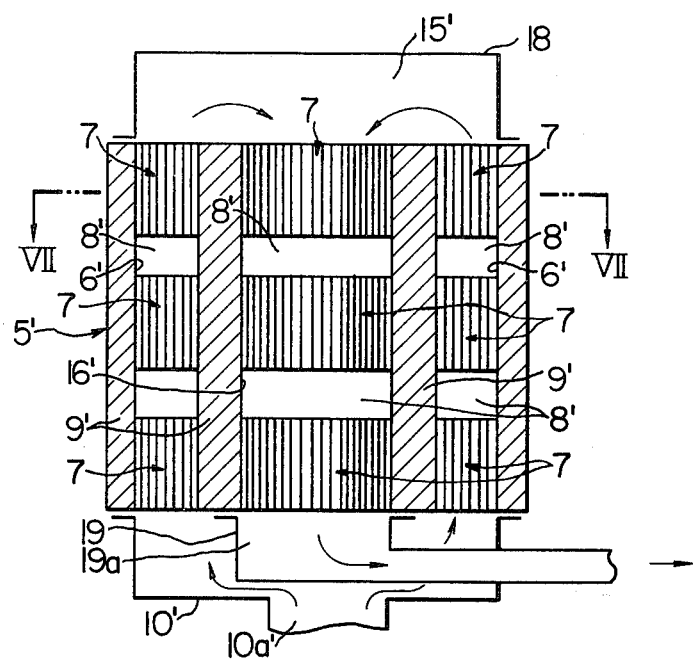
FIG. 6 is a schematic vertical cross-sectional view of the burner comprising another embodiment of the invention.
Figure 7:
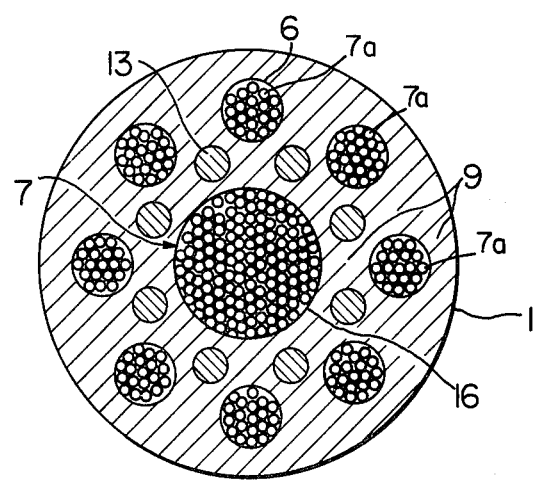
FIG. 7 is a cross-sectional view taken along the VII—VII in FIG. 6.

As shown in FIGS. 6 and 7, a combustor generally designated by the reference numeral 5' of a burner includes secondary passage 16' extending through a central portion of the combustor 5 a primary passage 6' being separated from the secondary passage 16' by the combustor wall 9' also extending through the combustor 5'. The primary passage 6' is composed of a plurality of passage sections arranged in a manner to surround the secondary passage 16' and each having three sets duct means 7 located therein and defining therebetween a combustion chambers 8'. Likewise, the secondary passage 16' has three sets of duct means 7 located therein and defining therebetween a combustion chamber 8'. Each set of duct means 7 includes of a plurality of fine tubes 7a. A flange 18 is attached to one end of the combustor 5' to maintain the primary passage 6' and secondary passage 16' in communication with each other at one end thereof, while the primary passage 6' communicates at the other end with the premixture inlet port 10a' formed in the flange 10' and the secondary passage 16' communicates with a combustion gas exhaust port 19a formed in a flange 19. Heaters 13 are provided for heating the sets of fine tubes 7a and combustion chambers 8' to a high temperature at startup. The heaters 13 are embedded in the combustor wall 9' between the primary and secondary passages 6' and 16'.

Operation of the embodiment of FIGS. 6 and 7 will be described by referring to the combustion of a low Btu gas consisting of methane and air. At startup, a current is passed to the heaters 13 to heat the sets of fine tubes 7a and combustion chambers 8' to a temperature in the vicinity of 1400° K. or over at least a temperature 900° K. which is the reaction initiating temperature. Then a premixture (low Btu gas) consisting of methane below its lean limit of flammability and air is supplied to the primary passage 6' through the inlet port 10a'. The premixture supplied to the primary passage 6' is first preheated by the uppermost sets of fine tubes 7a, and flows into the combustion chamber 8' located downstream of the uppermost sets of fine tubes 7a to be further mixed therein. The heated and mixed premixture is then introduced into the intermediate sets of fine tubes 7a. The premixture flows through the primary passage 6 while being repeatedly heated and mixed, and through the communicating opening 15' into the secondary passage 16', where the premixture flows toward the downstream side while being repeatedly heated and mixed as it passes through the sets of fine tubes 7a and combustion chambers 8' in the same manner as described by referring to the primary passage 6'. In the embodiment of FIGS. 6 and 7, the premixture flows from the upstream side toward the downstream side while being repeatedly heated and mixed as it passes through the alternately arranged sets of fine tubes 7a and combustion chambers 8'. The sets of fine tubes 7a and the combustion chambers 8' are heated to a high temperature, and the sets of fine tubes 7a have a large heat transfer area as compared with the passage area, so that the premixture is efficiently preheated in the sets of fine tubes 7a during its flow toward the downstream side. When the premixture is heated to about 900° K. in certain sets of fine tubes 7a, combustion reaction is gradually initiated and the premixture burns in complete combustion as it flows through the combustion chambers 8' and the sets of fine tubes 7a located on the downstream side, until the combustion gas reaches a temperature of 1300°–1500° K. The combustion gas heats the combustor wall 9' while flowing through the primary passage 6' or secondary passage 16'. Particularly when the combustion gas flows through the sets of fine tubes 7a disposed on the downstream side, heat exchange takes place efficiently and the combustion wall 9' is heated to a high temperature. Thus, the sets of fine tubes 7a and the combustion chambers 8' are heated to about 1400° K. soon after the startup and stable combustion can be sustained even if the heaters 13' are deactuated. During steady-state combustion, the burner according to the invention is capable of preheating to a high temperature and burning a low Btu gas without receiving a supply of a different form of energy from outside. In the embodiment of FIGS. 6 and 7, the location in which combustion of a low Btu gas (premixture) takes place may vary depending on its concentration (equivalence ratio). More specifically, an enriched gas has a low reaction initiating temperature, so that combustion takes place in the combustion chambers 8' on the upstream side of the primary passage 6. A lean gas having a high reaction initiating temperature burns in the combustion chambers 8' on the downstream side of the secondary passage 16'. By keeping the communicating opening 15' formed in the flange 18 and the exhaust port 19a formed in the flange at a temperature as high as that in the combustion chambers 8', it would be possible to have combustion take place in the communicating opening 15' and the outlet portion 19a. The embodiment of FIGS. 6 and 7 enables low Btu gases of a wide range of concentration to burn in the combustion chambers 8' located in suitable positions for gases of different concentrations, so that stable combustion can be obtained irrespective of whether the gas is enriched or lean. Particularly, the sets of fine tubes 7a are plural in number and each have a large heat exchange area, so that even a lean gas can be burned. The combustion gas efficiently undergoes heat exchange through the combustor wall 9' when flowing through the sets of duct means 7, so that even if combustion takes place in the combustion chambers 8' in the secondary passage 16' all the sets of fine tubes 7a and combustion chambers 8' can be kept at a high temperature. The embodiment of FIGS. 6 and 7 has particular utility for handling low Btu gases of different concentrations (equivalence ratios). That is, an enriched gas has a high combustion temperature and combustion thereof takes place on the upstream side of the primary passage 6'. Thus, the combustion gas undergoes heat exchange satisfactorily through the combustor wall 9', and the temperature of the combustion gas drawn off the exhaust port 19a, is considerably low. A lean gas has a low combustion temperature and burns on the downstream side of the secondary passage 16', so that heat exchange taking place through the combustor wall 9' is small in amount and the temperature of the combustion gas at the exhaust port 19a is not much lowered. Thus, it will be seen that the combustion gas obtained by using the embodiment of the burner of FIGS. 6 and 7 has a temperature that is substantially constant at all times irrespective of whether the gas is enriched or lean. The temperature being in the range between 1300° and 1400° K., the combustion gas has particular utility for driving a gas turbine. Since it is possible to burn a gas of any concentration as desired, it is possible to produce combustion gas of an optimum temperature for the intended use.

Material such as heat resisting steel or ceramics that can withstand a corrosion inducing atmosphere of high temperature should be selected for the combustor wall 9' defining the combustion chambers 8' and the fine tubes 7a constituting the sets of duct means 7. In the embodiment of FIGS. 6 and 7, each set of duct means 7 is composed of a plurality of fine tubes. The invention is not limited to this specific form of the fine tubes 7a and any known form of fine channels formed of heat resisting material that are permeable to air and have a large heat transfer area as compared with the passage area may be used. Moreover, in the embodiment of FIGS. 6 and 7, the secondary passage 16' is formed in the central portion of the combustor 5' and the primary passage 6' is located around the secondary passage 16'. This arrangement may be reversed, so that the primary passage 6' may be located in the central portion and the secondary passage 16' may be disposed on opposite sides thereof in the combustor 5'. This arrangement of the passage 6', 16' is covered by the invention as still another embodiment. The embodiments shown in FIGS. 6 and 7, which allows the combustion gas of high temperature to flow through the central portion of the combustor 5', is more advantageous in avoiding leakage of heat to outside. Although the plurality of primary passage sections are located around the secondary passage 16' extending through the central portion of the combustor 5', the passages 16 and 6' may be provided by forming the combustor 5' in the form of a double wall cylinder, or the primary passage sections may be arranged only on one side of the secondary passage 16'. In these cases, the primary passage 6' may be singular without being composed of the primary passage sections. The sets of fine tubes 7a and combustion chambers 8' provided in the primary passage 6' and secondary passage 16' need not be plural in number, and the primary and secondary passages 6' and 16' may each have one set of fine tubes 7a and one combustion chamber 8'.

From the foregoing description, it will be appreciated that the embodiment of the low Btu gas burner in FIGS. 6 and 7 includes a combustor 5' formed therein with a primary passage 6' and a secondary passage 16' separated from each other by a combustor wall 9', each of the primary and secondary passages 6', 16' mounting a plurality of sets of fine tubes 7a and a plurality of combustion chambers 8' each located on the downstream side of one of the sets of fine tubes 7a. Besides being able to achieve the effects achieved by the embodiment shown in FIG. 1, the embodiment shown in FIGS. 6 and 7 offers the additional advantage that it is able to handle such low Btu gases that vary widely in their concentration (equivalence ratio), without any trouble. By virtue of provision of a heater 13 in a combustor wall 9' of the combustion 5' as well as the communication of the primary and secondary passages with each other at one end thereof and a connection of the primary passage at the other end thereof to an inlet port and connection of the other end of the secondary passage to an exhaust port for the combustion gas, stable combustion of a low Btu gas can be obtained by a burner of relatively simple construction, and preheating of a low Btu gas to a high temperature and burning same can be achieved in steady-state combustion without receiving a supply of a different form of energy from outside. Thus, energy can be recovered from a low Btu gas, thereby contributing to conversion of energy. The burner is capable of eliminating the possible cause of air pollution, thereby contributing to prevention of environmental disruption. Combustion of a low Btu gas offers the additional advantage of realizing a large reduction in NOx released to atmosphere.

What is claimed is:

1. A low Btu gas burner comprising:
    a combustor means;
    means for defining a primary passage;
    means for defining a secondary passage separated from the primary passage;
    at least one set of fine ducts located in at least the primary passage;

at least one combustion chamber located on a downstream side of the at least one set of fine ducts;

at least one heater located in a wall of the combustor means;

means for communicating the primary and secondary passages with each other at first ends thereof;

means for connecting a second end of the primary passage to an inlet port for a low Btu gas; and means for connecting a second end of the secondary passage to an exhaust port for combustion gas, whereby the combustion gas heats the at least one set of fine ducts and the at least one combustion chamber through the wall of the combustor means.

2. A low Btu gas burner as claimed in claim 1, wherein said means for defining the primary passage includes the wall of the combustor means, and in said means for defining the secondary passage includes a casing means for accommodating and surrounding said combustor means so as to define the secondary passage between an inner surface of said casing means and an outer surface of the combustor means.

3. A low Btu gas burner as claimed in claim 1, wherein the primary passage is disposed in the combustor means, the secondary passage is separated from the primary passage by the wall of the combustor means, at least two sets of fine ducts and at least two combustion chambers are provided, said at least two sets of fine ducts are mounted in one of the primary and secondary passages and said two combustion chambers are located on a downstream side of one of the at least two sets of fine ducts.

4. A low Btu gas burner as claimed in claim 3, wherein said secondary passage is located in a central portion of the combustor means and said primary passage is located around the secondary passage and is separated therefrom by a wall of the combustor means.

5. A low Btu gas burner as claimed in claim 3, wherein said primary passage is located around the secondary passage and is composed of a plurality of primary passage sections.

6. A low Btu gas burner as claimed in claim 1, wherein a plurality of sets of fine ducts and a plurality of combustion chambers are provided in at least one of the primary passage and the secondary passage.

7. A low Btu gas burner as claimed in claim 2, wherein a second casing means is provided for surrounding said first mentioned casing means, said second casing means being dimensioned such that a clearance is provided between an inner surface of said second casing means and an outer surface of said first mentioned casing means, and wherein means are provided for securing said casing means to each other so as to prevent a transfer of heat from the first mentioned casing means through said second mentioned casing means.

8. A low Btu gas burner as claimed in claim 7, wherein said securing means is a heat insulating member.

9. A low Btu gas burner as claimed in claim 1, wherein at least three sets of fine ducts are provided in at least one of said primary and secondary passages, and wherein a combustion chamber is located on a downstream side of at least two of said sets of fine ducts.

10. A low Btu gas burner as claimed in claim 1, wherein the secondary passage is disposed in a center portion of the combustor means, a plurality of primary passages are disposed around the secondary passage, and at least one set of fine ducts are disposed in each of said primary passages and in said secondary passage.

* * * * *